2,944,077
PYROLYSIS OF BORIC ESTERS OF ARYL BROMO- AND CHLOROHYDRINS

Lambertus Gerke Heeringa and Muus Gerrit Jan Beets, both of Hilversum, Netherlands, assignors, by mesne assignments, to Polak & Schwarz International N.V., a corporation of the Netherlands No Drawing. Filed Apr. 30, 1957, Ser. No. 655,941

Claims priority, application Netherlands May 2, 1956

18 Claims. (Cl. 260—462)

The present invention relates to a process of preparing ω-bromo- and chlorostyrene, and their methyl homologues.

The invention is especially suitable for the preparation of ω-bromostyrene having the formula

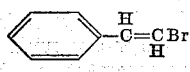

which is an important perfume.

A simple method of preparing ω-bromostyrene and its homologues by dehydration of styrene bromohydrin and corresponding homologues in the liquid phase has been described in U.S. Patent No. 2,824,144, filed May 26, 1953 by one of the joint inventors as co-inventor with E. A. Drukker. This method constituted a considerable technical advance, particularly since styrene halohydrins had become very easily accessible by the method described in U.S. Patent No. 2,763,695, of September 18, 1956.

However, the dehydration method of Patent No. 2,824,144 has the disadvantage that it requires the size of the dehydration apparatus to be relatively small since side reactions would ensue if the time period during which the starting material and the reaction product remain in contact with the generally strongly acidic dehydration agent at high temperatures were unduly prolonged. This is probably the reason why the yield in this process shows a certain dependency on the scale on which it is carried out.

It is the principal object of the present invention to provide a method of preparing compounds of the above-described type, which is equally simple and economical but which avoids the use of strongly acidic or highly reactive contact substances.

It is known to form boric esters from alcohols and boric acid. The pyrolysis of such esters to form an alkene is also known.

Surprisingly, we have now found that, notwithstanding the secondary character of the hydroxyl group and the steric position of the adjacent halogen atom, styrene-bromo- and chlorohydrins and their methyl homologues can also be easily converted to the boric esters by heating the hydrin with boric acid, with simultaneous splitting off of water. Since boric acid is an extremely weak acid, this treatment does not have any harmful effect on the starting material.

The reaction contemplated by this invention proceeds as follows:

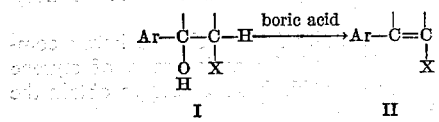

wherein (I) designates a styrene bromo- or chlorohydrin or a methyl homologue thereof and (II) is an ω-bromo- or chlorostyrene or a homologue thereof.

The boric esters, which are subjected to pyrolysis in accordance with the invention, may be prepared in any suitable manner. Thus, in addition to reacting the hydrin with boric acid, it may also be treated with boron oxide, in a manner known per se. Preferably, a catalytic amount of a suitable inhibitor, such as hydroquinone, is added. Furthermore, the boric esters may be prepared by trans-esterification of the hydrin with a lower boric ester, such as trimethyl borate, for instance.

The boric ester is readily converted into the corresponding ω-bromo- or chloro-styrene or methylstyrene such as ω-bromostyrene, by heating, preferably in vacuo. The reaction product is removed from the reaction zone by distillation, preferably concomitantly with its formation in order to prevent side reactions.

According to the invention, therefore, the ω-bromo- and chloro styrenes or methylstyrenes are manufactured by first preparing boric esters of the corresponding halohydrins and then subjecting the ester to pyrolysis, preferably in vacuo.

We have found that optimum results may be obtained when the molar ratio of the halohydrin to boric acid or like boron compound reactant is close to the molar ratio of the composition of the metaboric ester, i.e. one mol of boric acid per mol of halohydrin. Apparently a slight excess of boric acid or like boron compound reactant, for instance an excess of 10%, above the above-mentioned ratio favorably influences the yield. On the other hand, a larger excess, for instance 50%, seems to have a harmful effect. Also, a substantial reduction in the amount of boric acid or like boron compound reactant below the above ratio leads to a decrease in the yield. Thus, for instance, when only ⅓ mol of boric acid was used per mol of styrene bromohydrin, i.e. a ratio of reaction components corresponding to the composition of the ortho boric ester, only 12–13% of the theoretical yield of ω-bromostyrene was obtained.

While the present invention may be practiced with purified styrene bromo- or chlorohydrin, these starting materials are not readily available and it is, therefore, a great advantage of the process that it can be worked with crude halohydrins obtained, for instance, by the simple and economical method described in U.S. Patent No. 2,763,695. The impurities, such as the dihalostyrenes, can be removed by distillation, if desired, during the formation of the boric esters and before the pyrolysis.

It is another advantage of the method according to this invention that both steps, i.e. the ester formation and the pyrolysis, can be effected without intermediate purification of the boric ester or any othere interruption so that the entire process technically consists of only one process step which can be accomplished in a single reaction vessel.

The preparation of the ω-bromo- and chloro styrenes or methylstyrenes may be carried out by introducing boric acid together with the halohydrins into a conventional vacuum distillation apparatus and subsequently heating the mixture slowly in vacuo while distilling off the water obtained during the ester formation. When the ester formation has been completed, heating is continued while the ω-halostyrene or methylstyrene, such as ω-bromostyrene, is distilled off. We have found that a vacuum pressure of 15 to 18 mm. gives the most favorable yields. With such a vacuum, the pyrolysis starts already at a temperature of about 150° C. in the reaction mixture while the temperature rises to 170–180° C. for the greater part of the pyrolysis. The treatment may be continued with a further increase in temperature, if desired, until no more oil is distilled. The crude reaction product may be purified by simple distillation.

While the invention applies broadly to starting materials of the type (I) to yield products of the type (II) as defined above, it will be illustrated in the following examples:

Example I 1005 g. of purified styrene bromohydrin (5 mols), 340 g. of boric acid (5.5 mols) and 2 g. of hydroquinone were introduced into a distillation apparatus provided with an ice-cooled vessel. Distillation was carried on slowly at about 25 mm. pressure until no more water was formed and continued more rapidly at about 18 mm. pressure up to a distillation temperature of 140° C., the temperature in the reaction vessel being 190° C. The total reaction time was five hours.

The water layer was separated from the distillate, the non-aqueous layer was washed to neutral reaction and the 855 g. of crude ω-bromostyrene so obtained was fractionated at an efficient column.

The yield was about 60% of theoretical. B. P. 79–81° C./4–5 mm., $n_D^{20}$: 1.6065, solidification point: +1° C.

Example II 6030 g. of crude styrene bromohydrin (washed free of acid), 1800 g. of boric acid and 6 g. of hydroquinone were introduced into a vacuum still. Distillation was carried on with gradual heating at about 25 mm. pressure until no more water was formed and continued more rapidly at about 15 mm. pressure up to a distillation temperature of 130° C., the temperature in the reaction flask being 190° C. The total reaction time was 7½ hours.

The oil layer (3900 g.) was separated from the distillate, washed and fractionated at an efficient column.

The yield was 2221 g. of ω-bromostyrene with a B. P. of 79–81° C/4–5 mm. and $n_D^{20}$ 1.6030.

Example III 215 g. of purified 4-methylstyrene bromohydrin (1 mol), 64 g. of boric acid (1.03 mol) and 0.3 g. of hydroquinone were introduced into a vacuum still without fractionation column. Distillation was carried on for 40 minutes at 16 mm. pressure up to a distillation temperature of 130° C., the temperature in the reaction flask being 210° C. In the distillate, the oil layer (178 g.) was separated from the water layer, washed free of acid with water and fractionated in vacuo.

The 4-methyl-ω-bromostyrene thus obtained is a crystalline compound which can be further purified by recrystallization from alcohol. The colorless crystals have a M. P. of 45.8–46.1° C. and have a strong anise flavor.

Example IV 603 g. of purified styrene bromohydrin (3 mols), 105 g. of boron trioxide (1.5 mol) and 1 g. of hydroquinone weer introduced into a vacuum still without fractionation column. Distillation was carried on at about 24 mm. pressure with gradual heating until the formation of the boric ester was complete and continued at about 18 mm. pressure for 70 minutes up to a distillation temperature of 160° C., the temperature in the reaction flask being about 200° C.

The oil layer (510 g.) was separated from the distillate, washed free of acid with water and fractionated in vacuo.

The end product was ω-bromostyrene with B. P. of 79–81° C./2.5–3 mm. and $n_D^{20}$ 1.6068.

Example V 380 g. of purified styrene chlorohydrin (2.43 mols), 157 g. of boric acid (2.55 mols) and 0.5 g. of hydroquinone were introduced into a vacuum still. Distillation was carried on at about 23 mm. pressure until no more water was formed and continued for an hour at 18–19 mm. pressure up to a distillation temperature of 140° C., the temperature in the reaction flask being 207° C.

The oil layer of the distillate (248 g.) was washed neutral with water and fractionated in vacuo. The yield was 169 g. of ω-chlorostyrene with B. P. of 80–81° C./14–14.5 mm., $n_D^{20}$ 1.5779.

While the invention has been described in connection with certain preferred starting materials, its scope is limited only by the appended claims.

What is claimed is:

1. A process of preparing a compound selected from the group consisting of ω-halostyrene and ω-halomethylstyrene, wherein the halogen is selected from the group consisting of chlorine and bromine, comprising the steps of reacting a halohydrin correspondingly selected from the group consisting of bromo- and chlorohydrin of styrene and methylstyrene with a boron compound selected from the group of boric acid and boron oxide to obtain a boric ester of said halohydrin, removing water obtained during ester formation subjecting the boric ester to pyrolysis at temperatures between about 140° C. and about 210° C. and in vacuo and distilling off the reaction product.

2. The process of claim 1, wherein the halohydrin is a crude halohydrin.

3. The process of claim 1, wherein the pyrolysis of the boric ester is effected in a vacuum of 15 to 18 mm./Hg and at a starting temperature of about 150° C., said temperature being raised for the greater part of the pyrolysis to about 170–180° C.

4. The process of claim 1, wherein the boron compound is boric acid and the molar ratio of the halohydrin and the boric acid is about 1:1 to obtain the metaboric ester.

5. The process of claim 1, wherein the boron compound is boron oxide and the molar ratio of the halohydrin and the boron oxide is about 2:1 to obtain the metaboric ester.

6. A process of preparing ω-bromostyrene, comprising the steps of heating styrene bromohydrin with a substantially equi-molecular amount of boric acid, distilling off the water formed during the reaction and subjecting the metaboric ester thus obtained to pyrolysis at temperatures between about 140° C. and about 210° C. in vacuo.

7. The process of claim 6, wherein crude styrene bromohydrin is used.

8. The process of claim 6, wherein the pyrolysis of the boric ester is effected in a vacuum of 15 to 18 mm./Hg and at a starting temperature of about 150° C., said temperature being raised for the greater part of the pyrolysis to about 170–180° C.

9. A process of preparing ω-bromostyrene, comprising the steps of reacting styrene bromohydrin and a compound selected from the group consisting of boric acid and boron oxide under reduced pressure until no more water is formed, subjecting the thus obtained boric ester to pyrolysis at temperatures between about 140° C. and about 210° C. and under more reduced pressure, and distilling off the reaction product as it is formed.

10. The process of claim 9, wherein the pyrolysis of the boric ester is effected in a vacuum of 15 to 18 mm./Hg and at a starting temperature of about 150° C., said temperature being raised for the greater part of the pyrolysis to about 170–180° C.

11. The process of claim 9, wherein the boron compound is boric acid and the molar ratio of styrene bromohydrin and the boric acid is about 1:1 to obtain the metaboric ester.

12. The process of claim 9, wherein the boron compound is boron oxide and the molar ratio of styrene bromohydrin the boron oxide is about 2:1 to obtain the metaboric ester.

13. A process of preparing a compound selected from the group consisting of ω-halostyrene and ω-halomethylstyrene, wherein the halogen is selected from the group consisting of chlorine and bromine, comprising the step of subjecting a boric ester of a halohydrin selected from the group consisting of styrene halohydrin and methyl styrene halohydrin wherein the halogen is selected from the group consisting of chlorine and bromine, to pyrolysis at temperatures between about 140° C. and about 210° C. and in vacuo, said ester containing no other substituents.

14. The process of claim 13, wherein the ester is a metaboric ester.

15. A process of preparing ω-bromostyrene, comprising the step of subjecting a boric ester of styrene bromohydrin to pyrolysis at temperatures between 140° C. and 210° C. and in vacuo.

16. The process of claim 15, wherein the ester is a metaboric ester.

17. A process of preparing ω-bromostyrene, comprising the steps of subjecting a boric ester of styrene bromohydrin to pyrolysis in a vacuum of 15 to 18 mm./Hg and at a starting temperature of about 150° C., said temperature being raised for the greater part of the pyrolysis to about 170–180° C., and distilling off the reaction product as it is formed.

18. As a new composition of matter, a metaboric ester of a halohydrin selected from the group consisting of bromo- and chlorohydrin of styrene and methylstyrene.

References Cited in the file of this patent

UNITED STATES PATENTS 2,507,506  Dreisbach et al. ......... May 16, 1950

FOREIGN PATENTS 1,082,815  France ............... June 23, 1954